Patented Oct. 10, 1922.

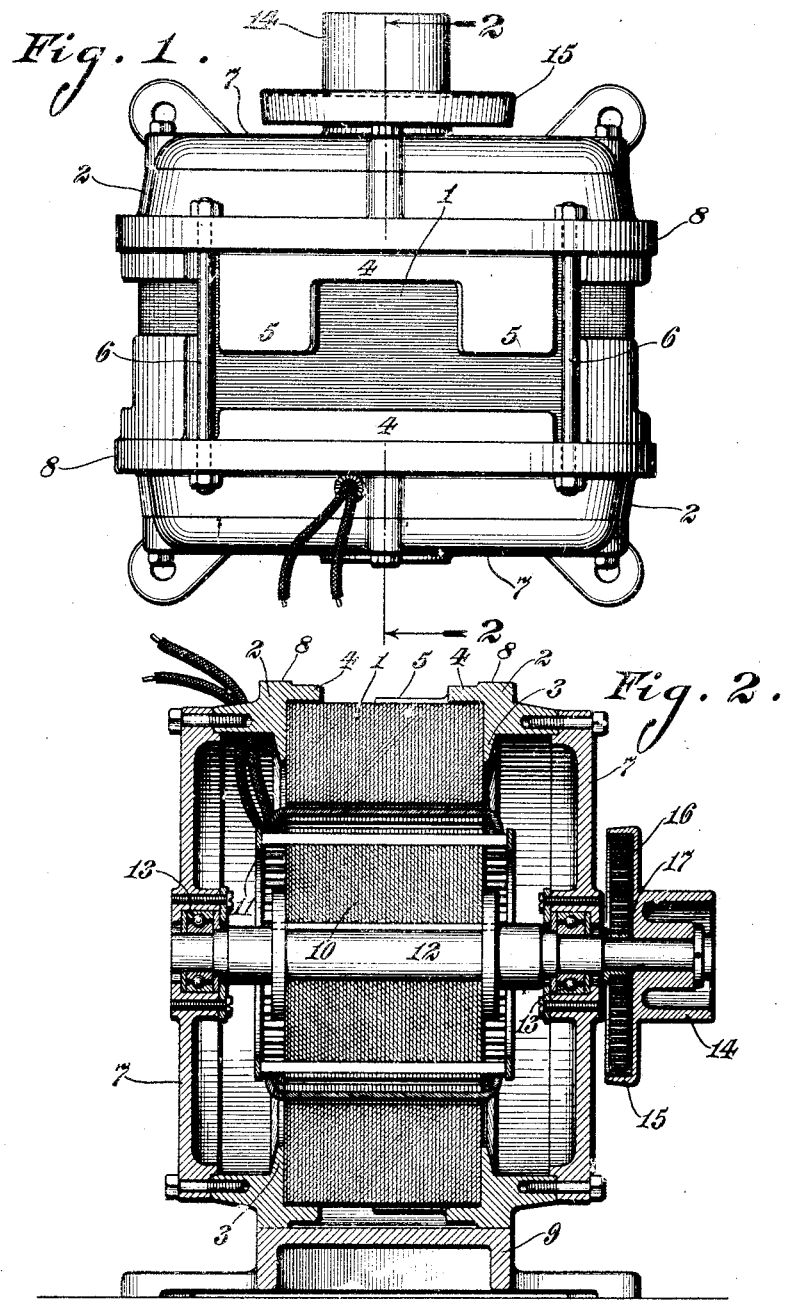

1,431,620

UNITED STATES PATENT OFFICE.

EDWIN C. BALLMAN, OF ST. LOUIS, MISSOURI, ASSIGNOR, BY DIRECT AND MESNE ASSIGNMENTS, TO VALLEY ELECTRIC COMPANY, OF WILMINGTON, DELAWARE, A CORPORATION OF DELAWARE.

ELECTRIC MOTOR.

Application filed September 4, 1917. Serial No. 189,687.

*To all whom it may concern:*

Be it known that I, EDWIN C. BALLMAN, a citizen of the United States, and residing at St. Louis, Missouri, have invented the new and useful Improvement in Electric Motors, of which the following is a specification.

This invention relates to dynamo-electric machines, and more particularly to electric motors of the single phase type.

In induction motors as now constructed, the stator lamina are clamped between a pair of cast iron end frames. With such constructions it is, however, difficult, unless very heavy end frames are used, to prevent distortion of the air gap.

One of the objects of this invention, therefore, is to provide a construction in which the stator end frames are so constructed as to secure maximum rigidity and uniformity of the air gap with minimum weight of material.

Further objects will appear from the detail description taken in connection with the accompanying drawing, in which, Figure 1 is a plan of an electric motor embodying this invention; and Figure 2 is a section on the line 2—2, Figure 1.

Referring to the accompanying drawing, 1 designates the stator lamina or punchings, and 2 the end frames. These end frames have radially projecting flanges 3, bearing against the stator lamina, and axially projecting flanges 4 arranged to overlie the lamina. Each flange 4 has projecting therefrom, in an axial direction, a series of fingers 5, which are arranged circumferentially of the end frames. In the application of the end frames to the lamina, the fingers 5 are arranged so as to overlap one another axially, as shown in Figure 1. Bolts 6 connect the end frames and securely clamp them on the lamina.

The end faces of the end frames are machined to receive the end plates 7, while the circumferential faces 8, are machined to cooperate with the machine face on the motor base 9, both the end and circumferential bases being turned true with respect to the inside face of the stator. With this construction, a stator of great rigidity is produced, and twisting and shifting of the end frames is entirely eliminated.

A rotor 10 of usual construction, and having the usual squirrel cage winding 11, is fixed to a shaft 12, which is in turn, mounted in bearings 13 in the end plates 7. The end of the shaft has loosely mounted thereon, a driving pulley or element 14. This driving pulley has an enlarged case 15, arranged to receive a spiral spring 16, the outer end of which is connected with the case, and the inner end of which is connected with a sleeve 17, fixed to the shaft 12.

The spiral spring 16 is constructed and proportioned to permit it to wind up to the extent of from thirty to forty turns of the drive shaft, that is, relative rotative movement of the drive shaft, with respect to the pulley, is permitted to that extent. If now, the starting switch is closed with the pulley 14 connected to drive its machinery, the rotor is permitted to revolve with respect to the pulley, until the spring is tensioned an amount sufficient to overcome the resistance of the machinery driven by the motor; thereafter, the pulley will revolve with the rotor. This construction, permitting rotation of the rotor with respect to the pulley, allows the rotor to approach normal speed so as to establish the proper magnetic and current relations, and torque, before the load is applied. In this way, complicated starting devices can be eliminated.

It is obvious that various changes may be made in the details of construction without departing from the spirit of this invention. It is to be understood, therefore, that various changes may be made in the specific construction shown and described.

Having thus described the invention, what is claimed is:—

1. In a dynamo-electric machine, a stator comprising laminæ, a pair of end frames therefor, and interlocking centering fingers on said end frames arranged to axially overlie said laminæ.

2. In a dynamo-electric machine, a stator comprising laminæ, a pair of end frames therefor, and interlocking centering fingers on said end frames arranged circumferentially around and projecting axially from said end frames, and adapted to overlie said laminæ.

3. In a dynamo-electric machine, a stator comprising laminæ, a pair of frames therefor, and centering fingers on said end frames arranged to axially overlie said laminæ, the fingers on one end frame being constructed to overlap the fingers on the other.

In testimony whereof I affix my signature this 31st day of May, 1917.

EDWIN C. BALLMAN.